(12) United States Patent
Li et al.

(10) Patent No.: US 12,226,034 B2
(45) Date of Patent: Feb. 18, 2025

(54) PREPARATION METHOD OF EDIBLE AND BIODEGRADABLE TABLEWARE

(71) Applicant: QINGDAO AGRICULTURAL UNIVERSITY, Qingdao (CN)

(72) Inventors: Man Li, Qingdao (CN); Yuanpu Liu, Qingdao (CN); Meng Ma, Qingdao (CN); Ruobing Jia, Qingdao (CN); Qingjie Sun, Qingdao (CN); Jing Wang, Qingdao (CN); Zejie Ou, Qingdao (CN)

(73) Assignee: QINGDAO AGRICULTURAL UNIVERSITY, Shandong (CN)

( * ) Notice: Subject to any disclaimer, the term of this patent is extended or adjusted under 35 U.S.C. 154(b) by 41 days.

(21) Appl. No.: 18/244,238

(22) Filed: Sep. 9, 2023

(65) Prior Publication Data
US 2023/0414022 A1 Dec. 28, 2023

Related U.S. Application Data

(63) Continuation of application No. PCT/CN2022/079522, filed on Mar. 7, 2022.

(51) Int. Cl.
*A47G 21/18* (2006.01)
*A23L 29/256* (2016.01)
(Continued)

(52) U.S. Cl.
CPC ............ *A47G 21/18* (2013.01); *A23L 29/256* (2016.08); *A23P 20/20* (2016.08); *A23P 30/10* (2016.08);
(Continued)

(58) Field of Classification Search
CPC ........ A47G 21/18; A47G 21/04; A47G 19/22; A23P 30/10; A23P 20/20; C08B 37/0039;
(Continued)

(56) References Cited

U.S. PATENT DOCUMENTS 2,017,162 A * 10/1935 Peters .................... A22C 13/00
426/140
3,922,360 A * 11/1975 Sneath ................... A23G 3/346
426/573

(Continued)

FOREIGN PATENT DOCUMENTS

| CN | 103861538 A | 6/2014 |
| CN | 105601950 A | 5/2016 |

(Continued)

*Primary Examiner* — Drew E Becker
(74) *Attorney, Agent, or Firm* — SZDC Law PC

(57) ABSTRACT

The present invention relates to a preparation method of an edible and biodegradable environmental-friendly tableware, and the present invention provides a preparation method of a natural macromolecule-based edible and degradable tableware, where the principles of endogenous diffusion and polymer crosslinking to prepare an edible tableware such as a straw, a cup and a bowl from a microscopic state. The tableware material of the present invention may degrade rapidly under natural conditions and requires no composting. The tableware prepared by the method of the present invention has an excellent water stability performance. In terms of material acquisition, carrageenan, sodium alginate and other raw materials are widely available and stable, and may constitute a good substitute for grain starch, wood, etc., and the material cost is low.

3 Claims, 2 Drawing Sheets

(51) Int. Cl.
*A23P 20/20* (2016.01)
*A23P 30/10* (2016.01)
*C08B 37/00* (2006.01)
*C08J 3/075* (2006.01)

(52) U.S. Cl.
CPC ...... *C08B 37/0039* (2013.01); *C08B 37/0042* (2013.01); *C08J 3/075* (2013.01); *A23V 2200/228* (2013.01); *A23V 2250/5026* (2013.01); *A23V 2250/5036* (2013.01); *A23V 2250/5054* (2013.01); *A23V 2250/5072* (2013.01); *A23V 2250/511* (2013.01); *C08J 2305/04* (2013.01); *C08J 2305/06* (2013.01); *C08J 2305/08* (2013.01); *C08J 2305/12* (2013.01)

(58) Field of Classification Search
CPC ... C08B 37/0042; C08J 3/075; C08J 2305/04; C08J 2305/06; C08J 2305/08; C08J 2305/12; A23L 29/256; A23L 29/272; A23L 29/231; A23L 29/275; A23V 2200/228; A23V 2250/5026; A23V 2250/5036–50366; A23V 2250/5054; A23V 2250/5072–50724; A23V 2250/511
See application file for complete search history.

(56) References Cited

U.S. PATENT DOCUMENTS

| | | | |
|---|---|---|---|
| 5,494,940 A | 2/1996 | Unger et al. | |
| 6,589,328 B1* | 7/2003 | Nussinovitch | A23P 30/40 426/77 |
| 2006/0286214 A1* | 12/2006 | Weiss | A23L 19/09 426/104 |
| 2013/0045246 A1* | 2/2013 | Edwards | A23P 20/17 426/135 |
| 2014/0057024 A1* | 2/2014 | Briganti | A23G 3/50 426/138 |
| 2014/0113821 A1 | 4/2014 | Gu et al. | |
| 2014/0308402 A1* | 10/2014 | Girard | A23B 7/05 426/310 |
| 2016/0324207 A1* | 11/2016 | Briganti | A23L 29/30 |
| 2018/0257270 A1* | 9/2018 | Endoh | B29C 39/38 |
| 2019/0336411 A1 | 11/2019 | Kim et al. | |
| 2020/0214484 A1* | 7/2020 | Briganti | A23G 3/50 |
| 2021/0059446 A1* | 3/2021 | Gill | A23G 3/545 |
| 2021/0324365 A1* | 10/2021 | Raghavan | B29C 39/02 |
| 2022/0079212 A1* | 3/2022 | Clark | A61K 9/51 |
| 2023/0128323 A1* | 4/2023 | Piunova | A23P 20/10 428/334 |

FOREIGN PATENT DOCUMENTS

| | | |
|---|---|---|
| CN | 108546333 A | 9/2018 |
| CN | 109876179 A | 6/2019 |
| CN | 111067136 A | 4/2020 |
| CN | 111491515 A | 8/2020 |
| CN | 111875853 A | 11/2020 |
| CN | 112831069 A | 5/2021 |
| CN | 113040579 A | 6/2021 |
| JP | 2010022287 A | 2/2010 |
| TW | 202000770 A | 1/2020 |
| WO | 2021019524 A1 | 2/2021 |
| WO | 2021074439 A1 | 4/2021 |

\* cited by examiner

PREPARATION METHOD OF EDIBLE AND BIODEGRADABLE TABLEWARE

This application is a Continuation Application of PCT/CN2022/079522, filed on Mar. 7, 2022, which claims priority to Chinese Patent Application No. 202111613417.1, filed on Dec. 17, 2021, which is incorporated by reference for all purposes as if fully set forth herein.

TECHNICAL FIELD

The present invention relates to the technical field of a preparation method of an edible and/or biodegradable environmental-friendly tableware, and in particular, to a preparation method of an edible and biodegradable gel tableware.

BACKGROUND

The use of petroleum-based plastic tableware (e.g. straws, cups, etc.) has been decreasing since China has released restrictions on the use of plastic bags. As an alternative to plastic tableware, paper tableware is difficult to satisfy demands of people, especially in terms of user experience and cost control, paper tableware needs to continuously change.

Polylactic acid, paper, and grain starch are the main materials of biodegradable tableware commercialized at present, and polylactic acid tableware does not belong to fully biodegradable materials in the real sense. Polylactic acid materials are classified as compostable and degradable materials rather than fully biodegradable materials in the United States and European Union, because the degradation of polylactic acid requires specific conditions, and the degradation process is relatively complex and requires a lot of subsequent operations; because of the characteristics of the raw materials, the paper tableware absorbs water quickly, has poor soaking resistance and poor use experience, especially cannot be used in hot water, which limits the development of paper tableware; although the water stability of the tableware made of cereal starch is better than that of the paper tableware, the tableware made of cereal starch still cannot resist the long-time soaking and high-temperature soaking, for example, the starch straw after the long-time soaking and high-temperature soaking has the same texture as the noodle, which is objectionable to users. Then, in the case of the shortage of world cultivated land and the crisis of food production, the industrial production of polylactic acid tableware and starch tableware is bound to compete with the production of food crops, so that it is difficult to achieve large-scale production.

In terms of preparation methods, biodegradable tableware commercialized at present is mainly prepared by screw extrusion technology, thermoplastic molding, injection molding and pressurization technology, etc. However, these technologies are mostly applicable to cold-bonding raw materials with low melting points, and it is difficult to perform production for raw materials which are difficult to melt, have relatively high melting points, and are difficult to solidify at normal temperature.

SUMMARY

The present invention provides a preparation method of a gel tableware, and the tableware prepared by the method of the present invention has the properties of edibility and biodegradability. Compared with the conventional twin-screw extrusion technology, the preparation method of a gel tableware described in the present invention is novel and is prepared by the endogenous diffusion method.

In this patent, "edible" means safe for consumption by a consumer. "Biodegradable" means that an item is capable of being decomposed into harmless products by the action of organisms (e.g. microorganisms) under typical environmental conditions.

A preparation method of a tableware, including: preparing a mixed aqueous solution of a gel A and a crosslinker under the heating condition, and preparing a tableware mold after cooling; placing the prepared tableware mold into an aqueous solution of a gel B, and standing to crosslink the gel B and the crosslinker on the surface of the mold to form a tableware model; and separating the tableware model from the mold, and drying the tableware model after separation, so as to obtain an finished tableware;

where the crosslinker is dispersed in the gel mold formed by the gel A and does not crosslink with the gel A; and a crosslinking reaction occurs between the gel B and the crosslinker.

The heating is performed to allow the gel A to sufficiently melt in the water, so that the heating temperature is determined by the chosen gel A.

Specifically, the gel A is one or more of agar, agarose, and polyvinyl alcohol.

Specifically, the crosslinker is one or more of calcium chloride, zinc chloride, calcium acetate, zinc acetate, calcium gluconate, zinc gluconate, zinc lactate, calcium lactate, potassium chloride, sodium phytate.

Specifically, the gel B is one or more of carrageenan, sodium alginate, pectin, gellan gum, and chitosan.

Further, the solution of the gel B further contains a plasticizer; and the plasticizer is one or more of glycerol, sorbitol, propylene glycol, and edible vegetable oil. Preferably, the plasticizer is glycerol. More preferably, the concentration of the plasticizer in the solution of the gel B is from 0 to 10% by weight.

Further, an edible waterproof coating is applied by spraying, dipping or brushing on the inner and/or outer surface of the finished tableware.

A tableware that can be prepared by the above method includes: a straw, a cup, a bowl, a dish, and a spoon, etc.

A method for preparing an edible and biodegradable straw, the specific steps being as follows:
(1) preparation of a gel column mold: preparing a mixed aqueous solution of a gel A and a crosslinker under the heating condition, filling the solution into a columnar mold, and forming a gel column mold after cooling;
(2) preparation of a tube model: placing the prepared gel column mold into an aqueous solution of a gel B, and standing to crosslink the gel B and the crosslinker on the surface of the mold to form a straw model with a certain thickness; and separating the straw model from the gel column mold; and
(3) drying of a gel tube model: drying a rinsed gel tube model to obtain a gel straw.

The columnar mold may be a glass tube, a metal tube, a plastic tube, and a ceramic tube.

A method for preparing an edible and biodegradable cup, bowl, dish and spoon, including:
(1) preparation of a gel mold: preparing a mixed aqueous solution of a gel A and a crosslinker under the heating condition, filling the solution into a mold in the shape of a cup, a bowl, a dish, or a spoon, and forming a gel mold after cooling;
(2) preparation of a tableware model: placing the prepared gel mold in the shape of a cup, a bowl, a dish, or a spoon into an aqueous solution of a gel B, and standing to crosslink the gel B and the crosslinker on the surface of one side of the gel mold to form a tableware model with a certain thickness; and separating the tableware model from the gel mold; and (3) drying of a tableware model: drying a rinsed gel tableware model to obtain a finished cup, bowl, dish, or spoon.

Carrageenan is a hydrophilic colloid, also known as an eucheuma colloid, a gelidium colloid, a pelvetia siliquosa colloid, and a chondrus colloid. Carrageenan is a hydrophilic colloid refined from a red algae seaweed, such as eucheuma, gelidium, and pelvetia siliquosa.

Sodium alginate is a byproduct after extraction of iodine and mannitol from a brown algae such as kelp or sargassum, and a natural polysaccharide with stability, solubility, viscosity and safety required for a pharmaceutical preparation excipient.

Chitosan is a product of removing part of the acetyl from the natural polysaccharide chitin and has many unique properties such as biodegradability, cell affinity, and biological effect.

Gellan gum is a natural colloid obtained by culturing *pseudomonas* in a liquid medium composed of glucose, corn syrup, phosphate, protein, nitrate and trace elements for two days, and has good stability, acid resistance, high-temperature resistance, thermal reversibility, and resistance to the action of microorganisms and enzymes.

Pectin is a kind of heteropolysaccharide widely existing in the primary wall and the middle layer of cell wall of plants, and is widely used in food, medical and health care products, and some cosmetics.

The present invention provides a new preparation method of an edible and degradable tableware, where the principles of endogenous diffusion and polymer crosslinking to prepare a tableware (a straw, a cup, a bowl, a dish, or a spoon) from a microscopic state. The tableware material of the present invention may degrade rapidly under natural conditions and requires no composting. The tableware prepared by the method of the present invention has an excellent water stability performance. In terms of material acquisition, the marine environment is rich in seaweed, and the raw materials such as carrageenan and sodium alginate may be provided continuously and may constitute a good substitute for grain starch, wood, etc., and the material cost is low.

BRIEF DESCRIPTION OF DRAWINGS

Advantages and benefits of the invention will become readily apparent to those skilled in the art upon reading the following detailed description of the specific embodiments. The drawings are illustrative and should not be considered as limiting the invention. In the drawings.

DETAILED DESCRIPTION OF THE EMBODIMENTS

Figure 1:
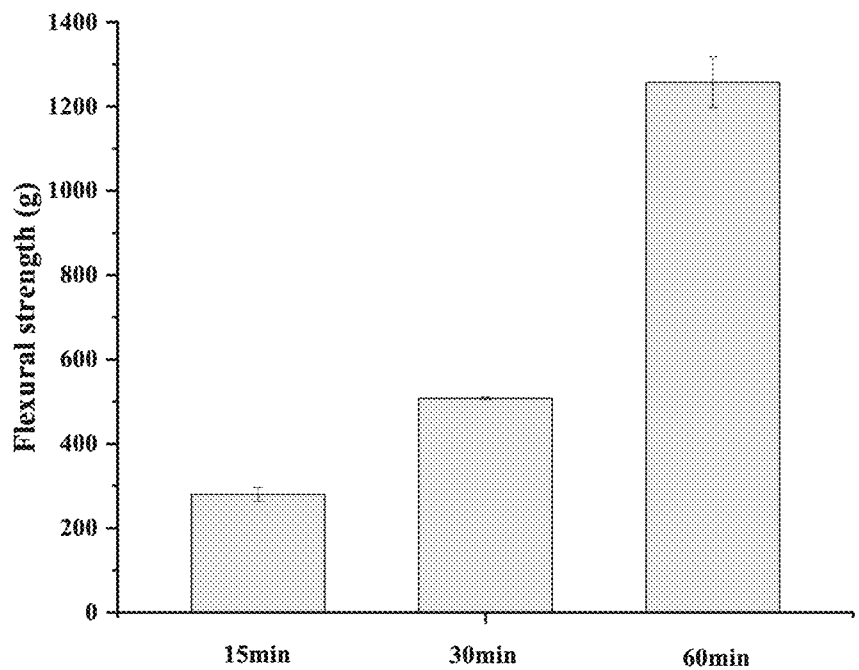
FIG. 1 shows flexural strength of a straw formed under the conditions of different diffusion times.

The terms used in the present invention, unless otherwise specified, generally have meanings normally understood by those of ordinary skills in the art. The present invention is further described in detail in combination with particular examples and with reference to data. The following examples are intended only to illustrate the present invention and are not intended to limit the scope of the present invention in any way.

Example 1

Taking a straw as an example, this example provides a method for preparing an edible and biodegradable gel straw, and the steps are as follows:

(1) preparation of a gel column mold: adding 3 parts by weight of agar and 8 parts by weight of calcium chloride into 100 parts by weight of deionized water, heating in a water bath at 95° C. for 30 min until complete dissolution to form an aqueous solution containing calcium chloride and agar, filling the aqueous solution into a columnar mold, and forming a gel column mold after cooling;

where the columnar mold may be a glass tube, a metal tube, a plastic tube, or a ceramic tube, and has a smooth inner wall, the inner diameter of the columnar mold may be freely chosen according to the inner diameter of the straw to be obtained, and a columnar mold having an inner diameter of 0.8 cm is used in Examples 1 to 5 for exemplary description.

(2) preparation of a tube model: cutting the gel column mold into sections of 20 cm in length; dissolving 20 parts by weight of sodium alginate in 1000 parts by weight of deionized water at normal temperature to form the sodium alginate solution; vertically placing the cut gel column molds into the sodium alginate solution, and standing for 15 min, 30 min, and 60 min respectively; and forming gel tube models having thicknesses of 1.4 mm, 2.1 mm, and 3.2 mm respectively around the gel column molds; and removing the gel column molds from the gel tube models respectively, and rinsing the solution adhered to the gel tube models by using deionized water.

(3) drying of a gel tube model: drying rinsed gel tube models to obtain gel straws having different thicknesses.

Example 2

Taking a straw as an example, this example provides a method for preparing an edible and biodegradable gel straw, and the steps are as follows:

(1) preparation of a gel column mold: adding 0.5 parts by weight of agarose and 8 parts by weight of calcium chloride into 100 parts by weight of deionized water, heating in a water bath at 95° C. for 30 min until complete dissolution to form an aqueous solution containing calcium chloride and agarose, filling the solution into a columnar mold, and forming a gel column mold after cooling.

(2) preparation of a tube model: cutting the gel column mold into sections of 20 cm in length; dissolving 20 parts by weight of sodium alginate in 1000 parts by weight of deionized water at normal temperature to form the sodium alginate solution; vertically placing the cut gel column molds into the sodium alginate solution, and standing for 15 min, 30 min, and 60 min respectively; and forming gel tube models having thicknesses of 1.4 mm, 2.1 mm, and 3.2 mm respectively around the gel column molds; and removing the gel column molds from the gel tube models, and rinsing the solution adhered to the gel tube models by using deionized water.
(3) drying of a gel tube model: drying rinsed gel tube models to obtain gel straws having different thicknesses.

Example 3

Taking a straw as an example, this example provides a method for preparing an edible and biodegradable gel straw, and the steps are as follows:
(1) preparation of a gel column mold: adding 3 parts by weight of agar and 10 parts by weight of zinc chloride into 100 parts by weight of deionized water, heating in a water bath at 95° C. for 30 min until complete dissolution to form an endogenous agar solution containing zinc chloride, filling the solution into a columnar mold, and forming a gel column mold after cooling;
(2) preparation of a tube model: cutting a gel column mold into gel columns of 20 cm in length; dissolving 50 parts by weight of sodium alginate in 1000 parts by weight of deionized water at normal temperature to form the sodium alginate solution; vertically placing the cut gel column molds into the sodium alginate solution, and standing for 15 min, 30 min, and 60 min respectively; and forming gel tube models having thicknesses of 1.9 mm, 3.2 mm, and 3.9 mm respectively around the gel column molds; and removing the gel column molds from the gel tube models, and rinsing the solution adhered to the gel tube models by using deionized water.
(3) drying of a gel tube model: drying rinsed gel tube models to obtain gel straws having different thicknesses.

Example 4

Taking a straw as an example, this example provides a method for preparing an edible and biodegradable gel straw, and the steps are as follows:
(1) preparation of a gel column mold: adding 3 parts by weight of agar and 8 parts by weight of calcium chloride into 100 parts by weight of deionized water, heating in a water bath at 95° C. for 30 min until complete dissolution to form an endogenous agar solution containing calcium chloride, filling the solution into a columnar mold, and forming a gel column mold after cooling;
(2) preparation of a tube model: cutting a gel column mold into gel columns of 20 cm in length; dissolving 20 parts by weight of sodium alginate and 100 parts by weight of glycerol in 1000 parts by weight of deionized water at normal temperature to form the mixed sodium alginate solution; vertically placing the cut gel column molds into the mixed sodium alginate solution, and standing for 15 min, 30 min, and 60 min respectively; and forming gel tube models having thicknesses of 1.4 mm, 2.1 mm, and 3.2 mm respectively around the gel column molds; and removing the gel column molds from the gel tube models, and rinsing the solution adhered to the gel tube models by using deionized water.
(3) drying of a gel tube model: drying rinsed gel tube models to obtain gel straws having different thicknesses.

In the method of the this example, glycerol is added, and when the air humidity is low (e.g. the air humidity is less than 40%), the straw stored for a long time may be cracked after repeated bending, which can be significantly improved by adding glycerol.

Example 5

Taking a straw as an example, this example provides a method for preparing an edible and biodegradable gel straw, and the steps are as follows:
(1) preparation of a gel column mold: adding 3 parts by weight of agar and 8 parts by weight of potassium chloride into 100 parts by weight of deionized water, heating in a water bath at 95° C. for 30 min until complete dissolution to form an endogenous agar solution containing potassium chloride, filling the solution into a columnar mold, and forming a gel column mold after cooling.
(2) preparation of a tube model: cutting a gel column mold into gel columns of 20 cm in length; dissolving 20 parts by weight of k-carrageenan in 1000 parts by weight of deionized water at 80° C. to form the k-carrageenan solution; vertically placing the cut gel column molds into the k-carrageenan solution at 55° C., and standing for 10 min, 20 min, and 30 min respectively; and forming gel tube models having thicknesses of 1.5 mm, 2.3 mm, and 3.5 mm respectively around the gel column molds; and removing the gel column molds from the gel tube models, and rinsing the solution adhered to the gel tube models by using deionized water.
(3) drying of a gel tube model: drying rinsed gel tube models to obtain gel straws having different thicknesses.

Example 6

Taking a straw as an example, this example provides a method for preparing an edible and biodegradable gel straw, and the steps are as follows:
(1) preparation of a gel column mold: adding 3 parts by weight of agar and 8 parts by weight of calcium chloride into 100 parts by weight of deionized water, heating in a water bath at 95° C. for 30 min until complete dissolution to form an endogenous agar solution containing calcium chloride, filling the solution into a columnar mold, and forming a gel column mold after cooling;
(2) preparation of a tube model: cutting a gel column mold into gel columns of 20 cm in length; dissolving 20 parts by weight of pectin in 1000 parts by weight of deionized water at 90° C. to form the pectin solution; vertically placing the cut gel column molds into the pectin solution at 55° C., and standing for 15 min, 30 min, and 60 min respectively, and forming gel tube models having thicknesses of 1.3 mm, 2.2 mm, and 3.2 mm respectively around the gel column molds; and removing the gel column molds from the gel tube models, and rinsing the solution adhered to the gel tube models by using deionized water.
(3) drying of a gel tube model: drying rinsed gel tube models to obtain gel straws having different thicknesses.

Example 7

Taking a straw as an example, this example provides a method for preparing an edible and biodegradable gel straw, and the steps are as follows:

(1) preparation of a gel column mold: adding 0.5 parts by weight of agarose, 4 parts by weight of calcium chloride, and 4 parts by weight of potassium chloride into 100 parts by weight of deionized water, heating in a water bath at 95° C. for 30 min until complete dissolution to form a mixed endogenous agarose solution containing calcium chloride and potassium chloride, filling the solution into a columnar mold, and forming a gel column mold after cooling.

(2) preparation of a tube model: cutting a gel column mold into gel columns of 20 cm in length; dissolving 10 parts by weight of k-carrageenan and 10 parts by weight of sodium alginate in 1000 parts by weight of deionized water at normal temperature to form the solution of k-carrageenan and sodium alginate; vertically placing the cut gel column molds into the solution of k-carrageenan and sodium alginate, and standing for 15 min, 30 min, and 60 min respectively; and forming gel tube models having thicknesses of 1.5 mm, 2.3 mm, and 3.4 mm respectively around the gel column molds; and removing the gel column molds from the gel tube models, and rinsing the solution adhered to the gel tube models by using deionized water.

(3) drying of a gel tube model: drying rinsed gel tube models to obtain gel straws having different thicknesses.

"Part by weight" in the above examples refers to a weight unit, such as g, kg, and ton.

Taking straw manufacturing as an example, a straw forming process is introduced by choosing three materials: agar, calcium chloride and sodium alginate.

In the straw manufacturing process, a crosslinker-calcium chloride is first mixed with a gel A-agar, and as the agar is solidified, the calcium chloride is uniformly dispersed in the agar gel. After the agar-made gel mold is put into the solution of gel B-sodium alginate, Ca2+ in the agar gel mold migrates outwards to form water-insoluble calcium alginate with the sodium alginate in the solution, and finally form calcium alginate tube model on a wall of the agar gel. The thickness of the tube model is mainly determined by the content of calcium ions and the content of sodium alginate as well as the reaction time, and is not specifically limited herein, and the specific soaking and standing time may be determined according to actual requirements.

An Example Method of Straw Drying:

In the case of straw drying, a rinsed gel tube model is firstly sleeved on a support column (preventing the tube model from being deformed, the diameter of the support column may be the same as or slightly less than the inner diameter of a columnar mold, and "slightly less than" means that the diameter of the support column is 0-0.05 mm less than the inner diameter of the columnar mold), and placed in a constant temperature and humidity chamber (temperature of 60° C., humidity of 55%) for drying, after drying, the straw and the support column are removed, and the support column is removed from the dried tube model (when removed, the support column may be soaked in deionized water at normal temperature for 1 min); the removed tube model is sleeved on a new support column (the diameter of the support column here is less than that of the support column in the previous step, because the tube model has already a certain hardness, and the support column does not require to tightly abut the inner wall of the tube model), and then placed into a constant temperature and humidity chamber (temperature of 60° C., humidity of 55%) for the second drying. During drying, the temperature and humidity settings in the constant temperature and humidity chamber are exemplary and not limiting.

Flexural Strength Test of a Straw

The performance analysis of the three thicknesses of straws prepared in Example 1 was performed in the following specific steps:

cutting three thicknesses of straws prepared in Example 1 into sections of 18 cm in length and removing uneven burrs, where the straws were taken as models for texture analysis, and a three-point flexural test was performed on the straws using a texture analyzer (Stable Micro Systems (SMS) Ltd. UK, TA. XT plus C) to simulate the pressure received by the straws during transportation and test the flexural strength of the straws. The parameters were set as follows: using a displacement mode, pre-measurement speed of 1 mm/sec, 2 mm/sec, and 10 mm/sec, probe height of 50 mm, compression depth of 30 mm, and distance between plates of 5 cm.

The test results are shown in FIG. 1:

It can be seen from FIG. 1 that the flexural strength of the straws increased as the diffusion time increased. Even after a short diffusion of 15 min, the flexural strength could reach 250 g. After a long diffusion time of 60 min, the flexural strength of the straws was about 1300 g. It can be seen that the straws prepared by the method of the present invention have good flexural resistance.

Tensile Performance Test of a Straw

A gel straw was prepared using the method of Example 1 with a standing time of 30 min. Three straws were placed in measuring cylinders, soaked in deionized water for 30 s, 30 min, and 24 h respectively, and taken out after soaking, the surface was dried using filter paper, a rectangular tensile bar with length of 4 cm and width of 2 cm was obtained by cutting, an universal extensograph (Instron, electronic universal material testing machine 5943) was used to perform tensile performance test. The test conditions were as follows: fixing fixture distance at 20 mm, tensile rate of 100 mm/min, and performing the tensile test at room temperature (25° C.).

Figure 2:
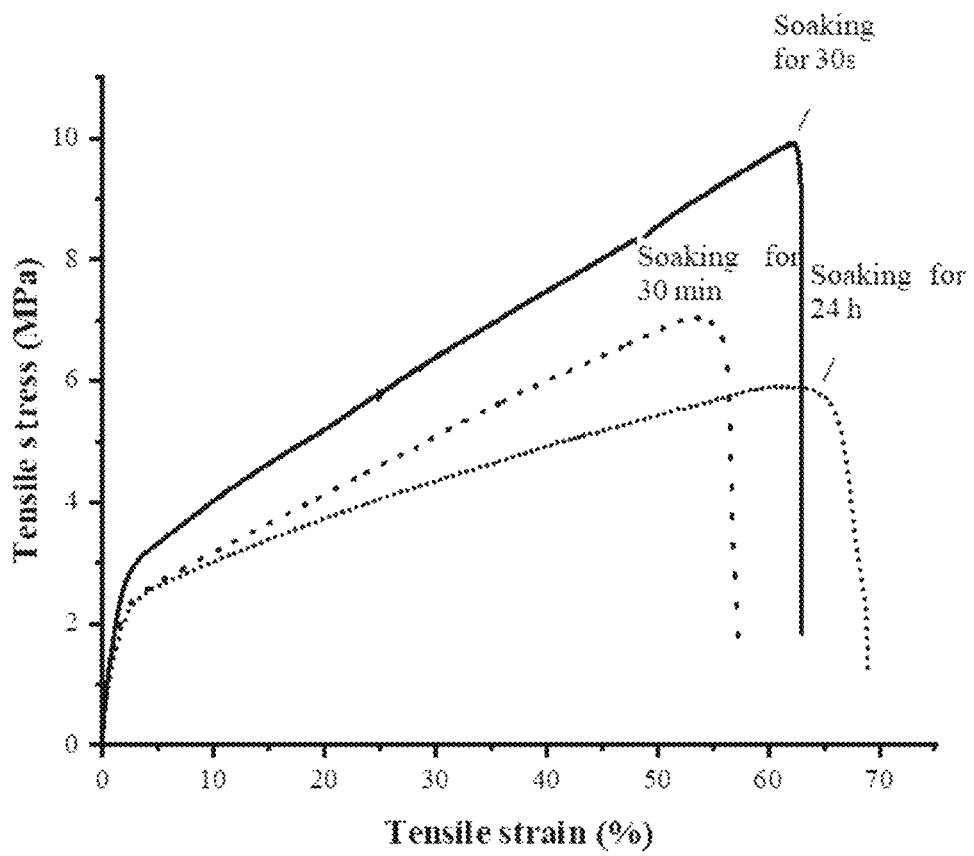
FIG. 2 shows a tensile strain-stress curve of a straw for different soaking times.
Figure 3:
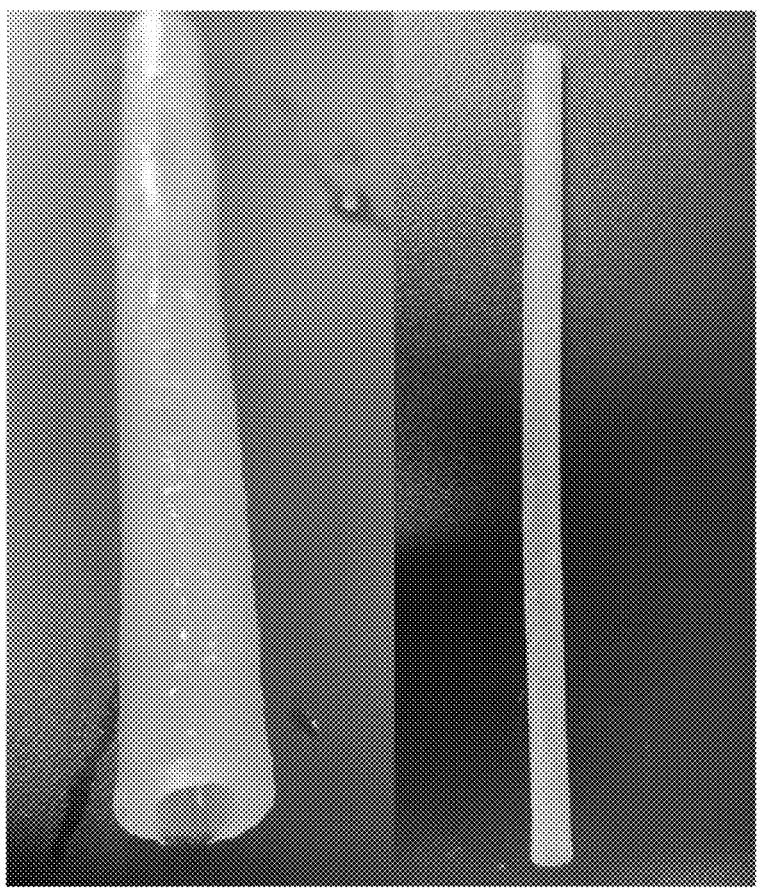
FIG. 3 shows a straw model prepared by the method of Example 1 of the present invention and a dried straw (the left shows a straw model obtained after standing for 30 min and the right shows a straw obtained after drying the tube model).

The test results are shown in FIG. 2:

It can be seen from FIG. 2 that the straws could maintain good tensile performance from soaking for 30 s to 24 h, so that the straws prepared in the present invention had good swelling-resistance and good soaking resistance.

Examples 1 to 7 describes the method of the present invention in detail using a straw as an example. The manufacturing method of a bowl, dish, cup and spoon is similar to that of a straw, and the main difference is a shaped gel column mold, so that the preparation method of several other tableware will not be described in detail herein.

In order to enhance water resistance and prolong shelf life, the edible tableware prepared by the method of the present invention may be coated with an edible coating. The edible coating is applied by spraying, dipping, or brushing, etc. on the inner and/or outer surface of the tableware.

The edible waterproof coating may be coconut oil, palm oil, beech oil, castor oil, cottonseed oil, hazelnut oil, olive oil, palm kernel oil, peanut oil, pericarp oil, poppy oil, blackcurrant seed oil, linseed oil, purple safflower oil, raisin seed oil, rapeseed oil, rice bran oil, safflower oil, sesame oil, sunflower seed oil, turmeric oil, soybean oil, almond oil, Brazil nut oil, cashew nut oil, pine nut oil, pistachio nut oil, and walnut oil; optionally short or medium or long chain triglycerides, monoglycerides and/or diglycerides; confectioner's glaze; acetylated monoglyceride; and edible wax such as beeswax, rice bran wax.

The above description is only the preferred examples of the present invention, and is not intended to limit the present invention in other forms, and any person skilled in the art may make use of the technical contents disclosed above to change or modify the equivalent examples with equivalent changes. However, any simple modification, equivalent change and modification made in accordance with the technical essence of the present invention without departing from the technical solution of the present invention are still within the scope of protection of the technical solutions of the present invention.

What is claimed is:

1. A preparation method of an edible and biodegradable tableware, the preparation method consisting of:
    preparing a mixed aqueous solution of a gel A and a crosslinker under a heating condition, and preparing a tableware mold after cooling;
    placing the prepared tableware mold into an aqueous solution of a gel B, and standing to crosslink the gel B and the crosslinker in the tableware mold on the surface of the mold to form a tableware model; and separating the tableware model from the mold, and drying the tableware model after separation, so as to obtain a finished tableware;
    wherein
    the crosslinker is dispersed in the gel mold formed by the gel A and does not crosslink with the gel A;
    a crosslinking reaction occurs between the gel B and the crosslinker;
    the gel A is one or more of agar and agarose;
    the crosslinker is one or more of calcium chloride, zinc chloride, calcium acetate, zinc acetate, calcium gluconate, zinc gluconate, zinc lactate, calcium lactate, potassium cholride, sodium phytate;
    the gel B is one or more of carrageenan, sodium alginate, pectin, gellan gum, and chitosan;
    the solution of the gel B contains a plasticizer;
    the plasticizer is glycerol;
    the concentration of the plasticizer in the solution of the gel B is 10% by weight;
    an edible waterproof coating is applied by spraying, dipping or brushing on the inner and/or outer surface of the finished tableware; and
    the tableware consisting of: a straw, a cup, a bowl, a dish, and a spoon.

2. A method for preparing a straw using the method according to claim 1, consisting of following steps:
    (1) preparation of a gel column mold: preparing a mixed aqueous solution of a gel A and a crosslinker under the heating condition, filling the solution into a columnar mold, and forming a gel column mold after cooling;
    (2) preparation of a tube model: placing the prepared gel column mold into an aqueous solution of a gel B, and standing to crosslink the gel B and the crosslinker in the gel column mold on the surface of the mold to form a straw model with a certain thickness; and separating the straw model from the gel column mold; and
    (3) drying of a gel tube model: drying a rinsed gel tube model to obtain a gel straw,
    when drying, the rinsed gel tube model is first placed on a first support column that has a diameter being the same as an inner diameter of the gel column mold or less than the inner diameter of the gel column mold, and then placed into a constant temperature and humidity box for drying; after drying, the first support column is removed from the gel tube model; the gel tube model is placed on a second support column with a diameter smaller than that of the first support column step, and the gel tube model is placed into the constant temperature and humidity box for continued drying,
    wherein the columnar mold is a glass tube, a metal tube, a plastic tube, and a ceramic tube.

3. A method for preparing a cup, a bowl, a dish, and a spoon using the method according to claim 1, consisting of:
    (1) preparation of a gel mold: preparing a mixed aqueous solution of a gel A and a crosslinker under the heating condition, filling the solution into a mold in the shape of a cup, a bowl, a dish, or a spoon, and forming a gel mold after cooling;
    (2) preparation of a tableware model: placing the prepared gel mold in the shape of a cup, a bowl, a dish, or a spoon into an aqueous solution of a gel B, and standing to crosslink the gel B and the crosslinker in the gel mold on the surface of one side of the gel mold to form a tableware model with a certain thickness; and separating the tableware model from the gel mold; and
    (3) drying of a tableware model: drying a rinsed gel tableware model to obtain a finished cup, bowl, dish, or spoon.

* * * * *